US012671241B2

(12) United States Patent
Krause

(10) Patent No.: US 12,671,241 B2
(45) Date of Patent: Jun. 30, 2026

(54) PROTECTION CIRCUIT, METHOD FOR PROTECTING ELECTRICAL LOAD, AND SYSTEM

(71) Applicant: 3M INNOVATIVE PROPERTIES COMPANY, St. Paul, MN (US)

(72) Inventor: Adam R. Krause, Charlotte, NC (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 160 days.

(21) Appl. No.: 18/883,838

(22) Filed: Sep. 12, 2024

(65) Prior Publication Data

US 2025/0096554 A1 Mar. 20, 2025

Related U.S. Application Data

(60) Provisional application No. 63/538,632, filed on Sep. 15, 2023.

(51) Int. Cl.
| | |
|---|---|
| *H02H 3/20* | (2006.01) |
| *H02H 3/02* | (2006.01) |
| *H02H 9/02* | (2006.01) |

(52) U.S. Cl.
CPC .............. *H02H 3/20* (2013.01); *H02H 3/023* (2013.01); *H02H 9/02* (2013.01); *H02H 3/202* (2013.01)

(58) Field of Classification Search
CPC .......... H02H 3/023; H02H 3/20; H02H 3/202; H02H 9/02
See application file for complete search history.

(56) References Cited

U.S. PATENT DOCUMENTS

| | | | |
|---|---|---|---|
| 5,144,517 A | 9/1992 | Wieth | |
| 9,768,694 B2 | 9/2017 | Kemp et al. | |
| 2012/0169274 A1* | 7/2012 | Thomsen ................. | H02H 3/20 |
| | | | 361/91.1 |
| 2015/0207449 A1* | 7/2015 | Clendenen ............. | H02H 3/023 |
| | | | 318/400.22 |
| 2018/0026439 A1* | 1/2018 | Lopez Rodriguez .. | H02H 3/023 |
| | | | 307/326 |
| 2021/0320489 A1* | 10/2021 | Ferguson ................. | H02H 3/04 |

FOREIGN PATENT DOCUMENTS

| | | | | |
|---|---|---|---|---|
| EP | 4300743 A1 * | 1/2024 | ............. | H02H 3/202 |
| WO | 2017144847 A1 | 8/2017 | | |

* cited by examiner

*Primary Examiner* — Fred Guillermety
(74) *Attorney, Agent, or Firm* — Katherine M. Scholz; David B. Patchett

(57) ABSTRACT

A protection circuit for use with a power source includes a Zener diode, a first resistor, and a second resistor, which together define its maximum voltage threshold. The power source is configured to provide an input voltage to an electrical load. The protection circuit further includes a shorting device and a current-limiting safety device. When the input voltage is less than the maximum voltage threshold, the shorting device is maintained in an off-state, causing the input voltage to be provided to the electrical load. When the input voltage is greater than or equal to the maximum voltage threshold, the shorting device switches to the on-state and electrically shorts the power source to a ground, causing the current-limiting safety device to break an electrical connection between the power source and an input point electrically connected to the electrical load, such that the electrical load is electrically disconnected from the power source.

14 Claims, 3 Drawing Sheets

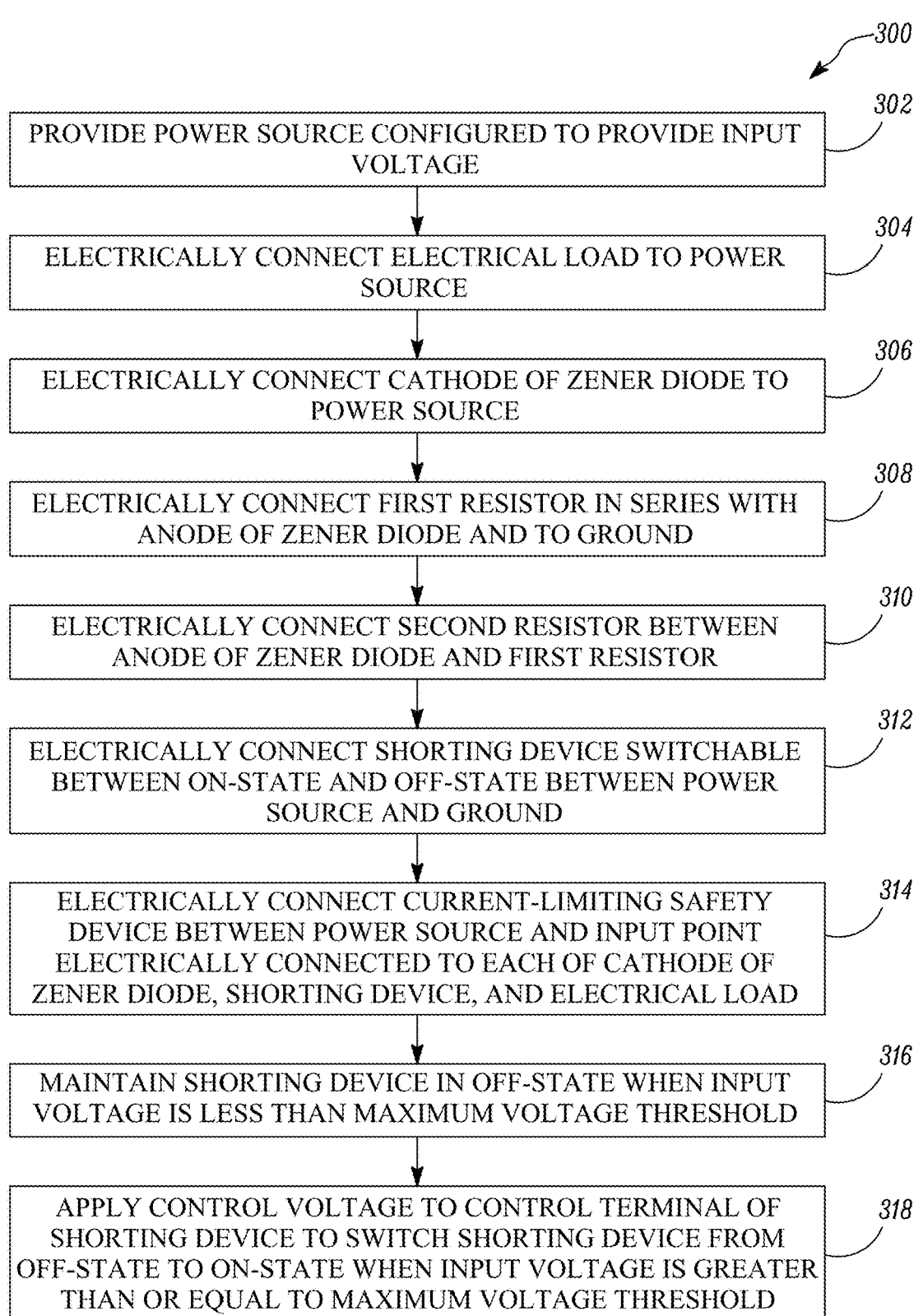

```
                                                              ┌─300
┌──────────────────────────────────────────────────┐  ┌─302
│   PROVIDE POWER SOURCE CONFIGURED TO PROVIDE INPUT │
│                      VOLTAGE                       │
└──────────────────────────────────────────────────┘
                         │
                         ▼
┌──────────────────────────────────────────────────┐  ┌─304
│   ELECTRICALLY CONNECT ELECTRICAL LOAD TO POWER    │
│                      SOURCE                        │
└──────────────────────────────────────────────────┘
                         │
                         ▼
┌──────────────────────────────────────────────────┐  ┌─306
│   ELECTRICALLY CONNECT CATHODE OF ZENER DIODE TO   │
│                   POWER SOURCE                     │
└──────────────────────────────────────────────────┘
                         │
                         ▼
┌──────────────────────────────────────────────────┐  ┌─308
│   ELECTRICALLY CONNECT FIRST RESISTOR IN SERIES WITH │
│      ANODE OF ZENER DIODE AND TO GROUND            │
└──────────────────────────────────────────────────┘
                         │
                         ▼
┌──────────────────────────────────────────────────┐  ┌─310
│   ELECTRICALLY CONNECT SECOND RESISTOR BETWEEN     │
│     ANODE OF ZENER DIODE AND FIRST RESISTOR        │
└──────────────────────────────────────────────────┘
                         │
                         ▼
┌──────────────────────────────────────────────────┐  ┌─312
│  ELECTRICALLY CONNECT SHORTING DEVICE SWITCHABLE   │
│  BETWEEN ON-STATE AND OFF-STATE BETWEEN POWER      │
│                SOURCE AND GROUND                   │
└──────────────────────────────────────────────────┘
                         │
                         ▼
┌──────────────────────────────────────────────────┐  ┌─314
│  ELECTRICALLY CONNECT CURRENT-LIMITING SAFETY      │
│  DEVICE BETWEEN POWER SOURCE AND INPUT POINT       │
│  ELECTRICALLY CONNECTED TO EACH OF CATHODE OF      │
│  ZENER DIODE, SHORTING DEVICE, AND ELECTRICAL LOAD │
└──────────────────────────────────────────────────┘
                         │
                         ▼
┌──────────────────────────────────────────────────┐  ┌─316
│  MAINTAIN SHORTING DEVICE IN OFF-STATE WHEN INPUT  │
│  VOLTAGE IS LESS THAN MAXIMUM VOLTAGE THRESHOLD    │
└──────────────────────────────────────────────────┘
                         │
                         ▼
┌──────────────────────────────────────────────────┐  ┌─318
│  APPLY CONTROL VOLTAGE TO CONTROL TERMINAL OF      │
│  SHORTING DEVICE TO SWITCH SHORTING DEVICE FROM    │
│  OFF-STATE TO ON-STATE WHEN INPUT VOLTAGE IS GREATER│
│  THAN OR EQUAL TO MAXIMUM VOLTAGE THRESHOLD        │
└──────────────────────────────────────────────────┘
```

*FIG. 3*

PROTECTION CIRCUIT, METHOD FOR PROTECTING ELECTRICAL LOAD, AND SYSTEM

CROSS REFERENCE TO RELATED APPLICATIONS

This application claims priority from U.S. Provisional Application Ser. No. 63/538,632, filed 15 Sep. 2023, the disclosure of which is incorporated by reference in its/their entirety herein.

TECHNICAL FIELD

The present disclosure relates generally to a protection circuit, a method for protecting an electrical load, and a system including the electrical load and the protection circuit.

BACKGROUND

Various electronic devices, such as safety devices, may be used in hazardous environments, such as those including an explosive atmosphere. The electronic devices operating in such hazardous environments may therefore need to be designed to prevent over-temperature conditions and possible spark conditions from occurring, even under certain fault conditions, such as an overvoltage condition.

To that end, the electronic devices may include a protection circuit that prevents occurrence of the overvoltage condition. One example of such a protection circuit is a crowbar circuit that utilizes a Zener diode for operation. However, conventional crowbar circuits may suffer from a high leakage current, especially when a Zener voltage of the Zener diode used is close to a nominal operating voltage of the electronic devices. The high leakage current may detrimentally affect various characteristics of the electronic devices, such as their battery life. To keep the leakage current of conventional crowbar circuits low, the Zener diode used in the conventional crowbar circuits may need to have a Zener voltage much higher than the nominal operating voltage of the electronic devices. This may impose stricter requirements on the downstream components of the electronic devices, and in some cases, may compromise the intrinsic safety of the electronic devices.

SUMMARY

In a first aspect, the present disclosure provides a protection circuit for use with a power source configured to provide an input voltage to an electrical load. The protection circuit includes a Zener diode including an anode and a cathode. The cathode is electrically connected to the power source. The protection circuit further includes a first resistor electrically connected in series with the anode of the Zener diode. The first resistor is further electrically connected to a ground. The protection circuit further includes a second resistor electrically connected between the anode of the Zener diode and the first resistor. The protection circuit further includes an intermediate point electrically disposed between the first resistor and the second resistor. The protection circuit further includes a shorting device switchable between an on-state and an off-state. The shorting device is electrically connected between the power source and the ground. The shorting device includes a control terminal electrically connected to the intermediate point. The shorting device switches from the off-state to the on-state when a control voltage is applied at the control terminal via the intermediate point. In the off-state, the shorting device electrically disconnects the power source from the ground. In the on-state, the shorting device electrically shorts the power source to the ground. The protection circuit further includes an input point electrically connected to each of the cathode of the Zener diode, the shorting device, and the electrical load. The first resistor and the second resistor together form a voltage divider at the intermediate point for the input voltage applied at the input point. The protection circuit further includes a current-limiting safety device electrically connected between the power source and the input point. The input voltage from the power source is normally applied at the input point via the current-limiting safety device, such that the electrical load is provided with the input voltage. The current-limiting safety device breaks an electric connection between the power source and the input point when an electric current flowing through the current-limiting safety device exceeds a maximum current threshold. The Zener diode, the first resistor, and the second resistor together define a maximum voltage threshold of the protection circuit. When the input voltage is less than the maximum voltage threshold, the shorting device is maintained in the off-state, causing the power source to be electrically disconnected from the ground and the input voltage to be provided to the electrical load. When the input voltage is greater than or equal to the maximum voltage threshold, the control voltage is applied at the control terminal, causing the shorting device to switch from the off-state to the on-state. In the on-state, the shorting device electrically shorts the power source to the ground, causing the electric current flowing through the current-limiting safety device to exceed the maximum current threshold and the current-limiting safety device to break the electrical connection between the power source and the input point. The electrical load is electrically disconnected from the power source upon breakage of the electric connection between the power source and the input point.

In a second aspect, the present disclosure provides an article of personal protective equipment (PPE). The article of PPE includes the protection circuit of the first aspect. The article of PPE is intrinsically safe according to the standards defined in IEC60079.

In a third aspect, the present disclosure provides a method for protecting an electrical load. The method includes providing a power source configured to provide an input voltage. The method further includes electrically connecting the electrical load to the power source. The method further includes electrically connecting a cathode of a Zener diode to the power source. The method further includes electrically connecting a first resistor in series with an anode of the Zener diode and to a ground. The method further includes electrically connecting a second resistor between the anode of the Zener diode and the first resistor. The method further includes electrically connecting a shorting device switchable between an on-state and an off-state between the power source and the ground. The shorting device includes a control terminal electrically connected to an intermediate point electrically disposed between the first resistor and the second resistor. The method further includes electrically connecting a current-limiting safety device between the power source and an input point electrically connected to each of the cathode of the Zener diode, the shorting device, and the electrical load. The method further includes maintaining the shorting device in the off-state when the input voltage is less than a maximum voltage threshold, causing the power source to be electrically disconnected from the ground and the input voltage to be provided to the electrical load. The method further includes applying a control voltage to the control terminal of the shorting device to switch the shorting device from the off-state to the on-state when the input voltage is greater than or equal to the maximum voltage threshold. In the on-state, the shorting device shorts the power source to the ground, causing the current-limiting safety device to break an electrical connection between the power source and the input point and the electrical load to be electrically disconnected from the power source.

In a fourth aspect, the present disclosure provides a system. The system includes a power source configured to provide an input voltage. The system further includes an electrical load connected to the power source. The electrical load is configured to receive the input voltage. The system further includes a protection circuit electrically connected between the power source and the electrical load. The protection circuit includes a Zener diode including an anode and a cathode. The cathode is electrically connected to the power source. The protection circuit further includes a first resistor electrically connected in series with the anode of the Zener diode. The first resistor is further electrically connected to a ground. The protection circuit further includes a second resistor electrically connected between the anode of the Zener diode and the first resistor. The protection circuit further includes an intermediate point electrically disposed between the first resistor and the second resistor. The protection circuit further includes a shorting device switchable between an on-state and an off-state. The shorting device is electrically connected between the power source and the ground. The shorting device includes a control terminal electrically connected to the intermediate point. The shorting device switches from the off-state to the on-state when a control voltage is applied at the control terminal via the intermediate point. In the off-state, the shorting device electrically disconnects the power source from the ground. In the on-state, the shorting device electrically shorts the power source to the ground. The protection circuit further includes an input point electrically connected to each of the cathode of the Zener diode, the shorting device, and the electrical load. The first resistor and the second resistor together form a voltage divider at the intermediate point for the input voltage applied at the input point. The protection circuit further includes a current-limiting safety device electrically connected between the power source and the input point. The input voltage from the power source is normally applied at the input point via the current-limiting safety device, such that the electrical load is provided with the input voltage. The current-limiting safety device breaks an electric connection between the power source and the input point when an electric current flowing through the current-limiting safety device exceeds a maximum current threshold. The Zener diode, the first resistor, and the second resistor together define a maximum voltage threshold of the protection circuit. When the input voltage is less than the maximum voltage threshold, the shorting device is maintained in the off-state, causing the power source to be electrically disconnected from the ground and the input voltage to be provided to the electrical load. When the input voltage is greater than or equal to the maximum voltage threshold, the control voltage is applied at the control terminal, causing the shorting device to switch from the off-state to the on-state. In the on-state, the shorting device electrically shorts the power source to the ground, causing the electric current flowing through the current-limiting safety device to exceed the maximum current threshold and the current-limiting safety device to break the electrical connection between the power source and the input point. The electrical load is electrically disconnected from the power source upon breakage of the electric connection between the power source and the input point.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

FIG. 3 is a flowchart depicting various steps of a method for protecting an electrical load according to an embodiment of the present disclosure.

DETAILED DESCRIPTION

Figure 1:
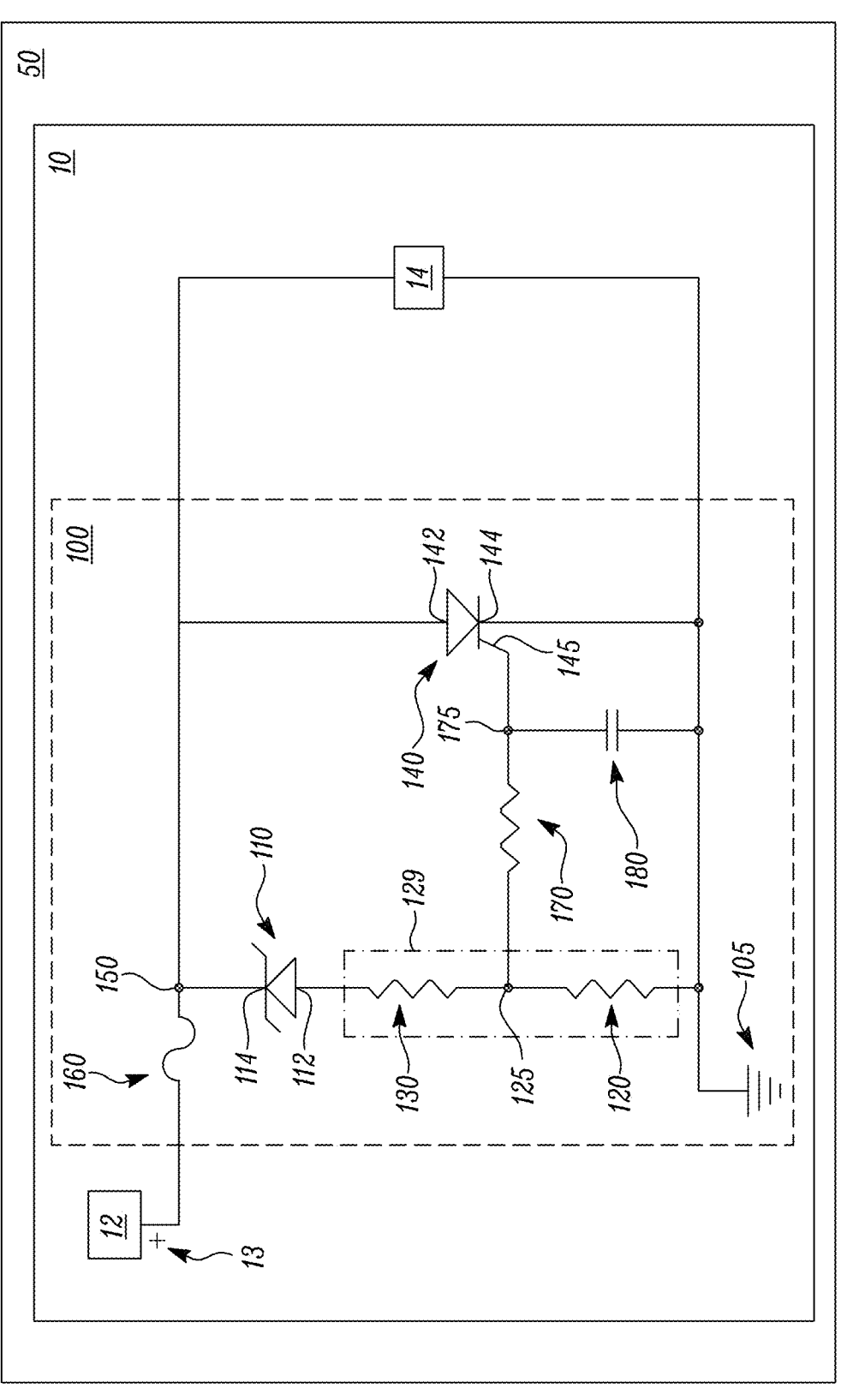
FIG. 1 is a schematic circuit diagram of a system according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the present disclosure, the following definitions are adopted.

As recited herein, all numbers should be considered modified by the term "about." As used herein, "a," "an," "the," "at least one," and "one or more" are used interchangeably.

As used herein as a modifier to a property or attribute, the term "generally," unless otherwise specifically defined, means that the property or attribute would be readily recognizable by a person of ordinary skill but without requiring absolute precision or a perfect match (e.g., within +/−20% for quantifiable properties).

The term "substantially," unless otherwise specifically defined, means to a high degree of approximation (e.g., within +/−10% for quantifiable properties) but again without requiring absolute precision or a perfect match.

The term "about," unless otherwise specifically defined, means to a high degree of approximation (e.g., within +/−5% for quantifiable properties) but again without requiring absolute precision or a perfect match.

Terms such as same, equal, uniform, constant, strictly, and the like, are understood to be within the usual tolerances or measuring error applicable to the particular circumstance rather than requiring absolute precision or a perfect match.

As used herein, when a first material is termed as "similar" to a second material, at least 90% by weight of the first and second materials are identical and any variation between the first and second materials comprises less than about 10% by weight of each of the first and second materials.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B."

As used herein, the term "electrically coupled" or "electrically connected" refers to direct coupling between components and/or indirect coupling between components via one or more intervening electric components, such that electric current can be passed between the two components. As an example of indirect coupling, two components can be referred to as being electrically coupled, even though they may have an intervening electric component between them which still allows electric current to pass from one component to the other component. Such intervening components may include, but are not limited to, wires, traces on a circuit board, and/or another electrically conductive medium/component.

The present disclosure provides a protection circuit for use with a power source configured to provide an input voltage to an electrical load. The protection circuit includes a Zener diode including an anode and a cathode. The cathode is electrically connected to the power source. The protection circuit further includes a first resistor electrically connected in series with the anode of the Zener diode. The first resistor is further electrically connected to a ground. The protection circuit further includes a second resistor electrically connected between the anode of the Zener diode and the first resistor. The protection circuit further includes an intermediate point electrically disposed between the first resistor and the second resistor. The protection circuit further includes a shorting device switchable between an on-state and an off-state. The shorting device is electrically connected between the power source and the ground. The shorting device includes a control terminal electrically connected to the intermediate point. The shorting device switches from the off-state to the on-state when a control voltage is applied at the control terminal via the intermediate point. In the off-state, the shorting device electrically disconnects the power source from the ground. In the on-state, the shorting device electrically shorts the power source to the ground. The protection circuit further includes an input point electrically connected to each of the cathode of the Zener diode, the shorting device, and the electrical load. The first resistor and the second resistor together form a voltage divider at the intermediate point for the input voltage applied at the input point. The protection circuit further includes a current-limiting safety device electrically connected between the power source and the input point. The input voltage from the power source is normally applied at the input point via the current-limiting safety device, such that the electrical load is provided with the input voltage. The current-limiting safety device breaks an electric connection between the power source and the input point when an electric current flowing through the current-limiting safety device exceeds a maximum current threshold. The Zener diode, the first resistor, and the second resistor together define a maximum voltage threshold of the protection circuit. When the input voltage is less than the maximum voltage threshold, the shorting device is maintained in the off-state, causing the power source to be electrically disconnected from the ground and the input voltage to be provided to the electrical load. When the input voltage is greater than or equal to the maximum voltage threshold, the control voltage is applied at the control terminal, causing the shorting device to switch from the off-state to the on-state. In the on-state, the shorting device electrically shorts the power source to the ground, causing the electric current flowing through the current-limiting safety device to exceed the maximum current threshold and the current-limiting safety device to break the electrical connection between the power source and the input point. The electrical load is electrically disconnected from the power source upon breakage of the electric connection between the power source and the input point.

The protection circuit of the present disclosure may ensure that the electrical load receives the input voltage only when a magnitude of the input voltage is less than or equal to a maximum safe operating voltage of the electrical load. The protection circuit may thus prevent an overvoltage condition (i.e., a condition where the electrical load receives a greater magnitude of voltage than its maximum safe operating voltage) from occurring. The protection circuit may consequently prevent over-temperature conditions and possible spark conditions from occurring, which may otherwise occur in the absence of the protection circuit.

Moreover, the protection circuit may offer improved design freedom by virtue of the voltage divider. Specifically, the first resistor and the second resistor that form the voltage divider may be selected to adjust the maximum voltage threshold of the protection circuit as desired while keeping a leakage current of the protection circuit low.

Advantageously, the protection circuit may be designed (by selecting the Zener diode, the first resistor, and the second resistor) to have the maximum voltage threshold close to a nominal operating voltage of the electrical load while having a low leakage current, especially in comparison to a conventional crowbar circuit. As an example, if the nominal operating voltage of the electrical load is 5 volts and the maximum safe operating voltage of the electrical load is 6 volts, the protection circuit may be designed to have the maximum voltage threshold of 5.5 volts while having a relatively low leakage current. Thus, the maximum voltage threshold of the protection circuit may be adjusted more readily while keeping the leakage current low.

An electronic device, such as an article of PPE, including the protection circuit may be intrinsically safe. Specifically, the electronic device may be intrinsically safe according to the standards defined in IEC60079. The protection circuit may ensure that the electronic device does not experience the over-temperature conditions and the possible spark conditions, which may otherwise occur in the absence of the protection circuit. Thus, the electronic device may be suitable for use in hazardous environments, such as those including an explosive atmosphere.

Referring now to the figures, FIG. 1 illustrates a schematic circuit diagram of a system 10 according to an embodiment of the present disclosure.

The system 10 includes a power source 12 (schematically depicted by a block in FIG. 1) and an electrical load 14 (schematically depicted by a block in FIG. 1). The electrical load 14 is connected to the power source 12. The system 10 may be a power supply system configured to supply electrical power from the power source 12 to the electrical load 14 under normal operational conditions and electrically disconnect the electrical load 14 from the power source 12 under fault conditions, such as an overvoltage condition.

The power source 12 is configured to provide an input voltage 13. Further, the electrical load 14 is configured to receive the input voltage 13. That is, the power source 12 is configured to provide the input voltage 13 to the electrical load 14.

The power source 12 may include an energy storage device, for example, one or more primary batteries (i.e., non-rechargeable batteries), one or more secondary batteries (i.e., rechargeable batteries), one or more supercapacitors, etc. The electrical load 14 may include one or more circuits including one or more electrical and/or electronic components.

The system 10 further includes a protection circuit 100 (schematically indicated by a dashed rectangle in FIG. 1) electrically connected between the power source 12 and the electrical load 14. That is, the protection circuit 100 is for use with the power source 12. The protection circuit 100 may protect the electrical load 14, for example, if/when the power source 12 malfunctions.

The protection circuit 100 includes a Zener diode 110. The Zener diode 110 includes an anode 112 and a cathode 114. The cathode 114 is electrically connected to the power source 12. The protection circuit 100 further includes a first resistor 120 electrically connected in series with the anode 112 of the Zener diode 110. The first resistor 120 is further electrically connected to a ground 105. The ground 105 may be defined as a reference voltage which is considered to be at a ground potential (i.e., about 0 volts), but if desired, may be at some other predefined potential.

Therefore, the Zener diode 110 may be reverse biased in the protection circuit 100. The Zener diode 110 has a Zener voltage. As used herein, the term "Zener voltage" refers to the magnitude of reverse voltage, which when applied across the Zener diode 110, causes a relatively large current to flow through the Zener diode 110.

The protection circuit 100 further includes a second resistor 130 electrically connected between the anode 112 of the Zener diode 110 and the first resistor 120. The Zener diode 110, the first resistor 120, and the second resistor 130 may be electrically connected in series. Due to the Zener diode 110 being reverse biased, the protection circuit 100 may have a leakage current flowing through the Zener diode 110 to the ground 105 when the input voltage 13 is less than the Zener voltage. The second resistor 130 may reduce the leakage current.

The protection circuit 100 further includes a shorting device 140. The shorting device 140 is electrically connected between the power source 12 and the ground 105. Specifically, in some embodiments, the shorting device 140 includes a first terminal 142 electrically connected to the power source 12 and a second terminal 144 electrically connected to the ground 105.

The protection circuit 100 further includes an intermediate point 125 electrically disposed between the first resistor 120 and the second resistor 130. The shorting device 140 further includes a control terminal 145 electrically connected to the intermediate point 125.

The shorting device 140 is switchable between an on-state and an off-state. Specifically, the shorting device 140 switches from the off-state to the on-state when a control voltage is applied at the control terminal 145 via the intermediate point 125. The control voltage that causes the shorting device 140 to switch from the off-state to the on-state may depend upon the shorting device 140. As an example, in some cases, the control voltage may be greater than or equal to about 700 millivolts.

In the off-state, the shorting device 140 electrically disconnects the power source 12 from the ground 105. Specifically, in some embodiments, in the off-state, the shorting device 140 electrically disconnects the first terminal 142 from the second terminal 144. In the on-state, the shorting device 140 electrically shorts the power source 12 to the ground 105. Specifically, in some embodiments, in the on-state, the shorting device 140 electrically connects the first terminal 142 with the second terminal 144.

In some embodiments, the shorting device 140 is a transistor. In some embodiments, the shorting device 140 is a silicon controlled rectifier (SCR) or a triode for alternating current (TRIAC). In such embodiments, the control terminal 145 of the shorting device 140 is a gate terminal. In the illustrated embodiment of FIG. 1, the shorting device 140 is a SCR. In some other embodiments, the shorting device 140 is a TRIAC.

The protection circuit 100 further includes an input point 150 electrically connected to each of the cathode 114 of the Zener diode 110, the shorting device 140, and the electrical load 14. The first resistor 120 and the second resistor 130 together form a voltage divider 129 (indicated by a dash-dot rectangle in FIG. 1) at the intermediate point 125 for the input voltage 13 applied at the input point 150. The control voltage may be an output of the voltage divider 129 that is applied to the control terminal 145 via the intermediate point 125 and switch the shorting device 140 from the off-state to the on-state.

The protection circuit 100 further includes a current-limiting safety device 160 electrically connected between the power source 12 and the input point 150. The input voltage 13 from the power source 12 is normally applied at the input point 150 via the current-limiting safety device 160, such that the electrical load 14 is provided with the input voltage 13.

The current-limiting safety device 160 breaks an electric connection between the power source 12 and the input point 150 when an electric current flowing through the current-limiting safety device 160 exceeds a maximum current threshold. In some embodiments, the current-limiting safety device 160 is a fuse. In some other embodiments, the current-limiting safety device 160 may be a circuit breaker.

The Zener diode 110, the first resistor 120, and the second resistor 130 together define a maximum voltage threshold of the protection circuit 100. Specifically, the Zener voltage of the Zener diode 110, a resistance of the first resistor 120, and a resistance of the second resistor 130 may define the maximum voltage threshold of the protection circuit 100. In some embodiments, the maximum voltage threshold is greater than or equal to the Zener voltage.

By way of example, in some cases, the Zener voltage may be from about 2.8 volts to about 5.07 volts. Further, each of the first resistor 120 and the second resistor 130 may have a resistance of from about 10 ohms to about 5 kiloohms.

The Zener diode 110, the first resistor 120, and the second resistor 130 may be selected based on a maximum safe operating voltage of the electrical load 14, such that the maximum voltage threshold of the protection circuit 100 is less than or equal to the maximum safe operating voltage of the electrical load 14. For example, if the maximum safe operating voltage of the electrical load 14 is 5 volts, the maximum voltage threshold of the protection circuit 100 may be 5 volts or less. In another example, if the maximum safe operating voltage of the electrical load 14 is 15 volts, the maximum voltage threshold of the protection circuit 100 may be 15 volts or less.

When the input voltage 13 is less than the maximum voltage threshold, the shorting device 140 is maintained in the off-state, causing the power source 12 to be electrically disconnected from the ground 105 and the input voltage 13 to be provided to the electrical load 14. Specifically, in some embodiments, when the input voltage 13 is less than the maximum voltage threshold, the control voltage is not applied at the control terminal 145 of the shorting device 140. The first resistor 120 may function as a pull-down resistor that keeps the shorting device 140 in the off-state when the input voltage 13 is less than the maximum voltage threshold.

When the input voltage 13 is greater than or equal to the maximum voltage threshold, the control voltage is applied at the control terminal 145, causing the shorting device 140 to switch from the off-state to the on-state. Specifically, in some embodiments, when the input voltage 13 is greater than or equal to the maximum voltage threshold, the control voltage is applied at the control terminal 145 of the shorting device 140.

In the on-state, the shorting device 140 electrically shorts the power source 12 to the ground 105, causing the electric current flowing through the current-limiting safety device 160 to exceed the maximum current threshold and the current-limiting safety device 160 to break the electrical connection between the power source 12 and the input point 150. The electrical load 14 is electrically disconnected from the power source 12 upon breakage of the electric connection between the power source 12 and the input point 150.

As discussed above, the maximum voltage threshold of the protection circuit 100 may be less than or equal to the maximum safe operating voltage of the electrical load 14. If/when the power source 12 malfunctions and provides the input voltage 13 having a greater magnitude than the maximum voltage threshold, the protection circuit 100 may electrically disconnect the electrical load 14 from the power source 12.

As a result, the protection circuit 100 may ensure that the electrical load 14 receives the input voltage 13 only when a magnitude of the input voltage 13 is less than or equal to the maximum safe operating voltage of the electrical load 14. The protection circuit 100 may thus prevent an overvoltage condition (i.e., a condition where the electrical load 14 receives a greater magnitude of voltage than its maximum safe operating voltage) from occurring. The protection circuit 100 may consequently prevent over-temperature conditions and possible spark conditions from occurring.

Moreover, the protection circuit 100 may offer improved design freedom by virtue of the voltage divider 129. Specifically, the first resistor 120 and the second resistor 130 that form the voltage divider 129 may be selected to adjust the maximum voltage threshold of the protection circuit 100 as desired while keeping the leakage current of the protection circuit 100 low.

Advantageously, the protection circuit 100 may be designed (by selecting the Zener diode 110, the first resistor 120, and the second resistor 130) to have the maximum voltage threshold close to a nominal operating voltage of the electrical load 14 while having a low leakage current, especially in comparison to a conventional crowbar circuit. As an example, if the nominal operating voltage of the electrical load 14 is 5 volts and the maximum safe operating voltage of the electrical load 14 is 6 volts, the protection circuit 100 may be designed have the maximum voltage threshold of 5.5 volts while having a relatively low leakage current. Thus, the maximum voltage threshold of the protection circuit 100 may be adjusted more readily while keeping the leakage current low.

An electronic device (e.g., a safety device) including the protection circuit 100 may be intrinsically safe. Specifically, the electronic device may be intrinsically safe according to the standards defined in IEC60079. The protection circuit 100 may ensure that the electronic device does not experience the over-temperature conditions and the possible spark conditions, which may otherwise occur in the absence of the protection circuit 100. Thus, the electronic device may be suitable for use in hazardous environments, such as those including an explosive atmosphere.

In some embodiments, the protection circuit 100 further includes a third resistor 170 electrically connected between the control terminal 145 of the shorting device 140 and the intermediate point 125. By way of example, in some cases, the third resistor 170 may have a resistance of from about 10 ohms to about 5 kiloohms.

In some embodiments, the protection circuit 100 further includes a connection point 175 electrically disposed between the intermediate point 125 and the control terminal 145. In some embodiments, the connection point 175 may be electrically disposed between the third resistor 170 and the control terminal 145.

In some embodiments, the protection circuit 100 further includes a capacitor 180 electrically connected between the ground 105 and the connection point 175. The capacitor 180 may prevent accidental switching of the shorting device 140 from the off-state to the on-state. The capacitor 180 may have a capacitance high enough to filter noise. By way of example, the capacitor 180 may have a capacitance of from about 33 picofarads to about 10 microfarads.

As shown in FIG. 1, in some embodiments, an article of personal protective equipment (PPE) 50 may include the system 10. Specifically, in some embodiments, the article of PPE 50 includes the protection circuit 100.

The article of PPE 50 may include any article that can be worn by a user for the purpose of preventing or decreasing personal injury or health hazard to the user in or around a hazardous environment. The article of PPE 50 may include safety glasses, safety goggles, face shields, face masks, respirators, gloves, suits, gowns, aprons, hard hats, or any other article that includes one or more components that utilizes electrical power for operation. The one or more components that utilizes electrical power for operation may form the electrical load 14.

In some embodiments, the article of PPE 50 may be a respiratory device. For example, the article of PPE may include a self-contained breathing apparatus (SCBA), a powered air purifying respirator (PAPR), and the like. In some embodiments, the electrical load 14 may include a blower. The electrical load 14 may include a fan, a blower, or any other device that utilizes electrical power for operation.

In some embodiments, the article of PPE 50 is intrinsically safe according to the standards defined in IEC60079. The protection circuit 100 may ensure that the article of PPE 50 does not experience the over-temperature conditions and the possible spark conditions, which may otherwise occur in the absence of the protection circuit 100. Thus, the article of PPE 50 may be suitable for use in hazardous environments, such as those including an explosive atmosphere.

Figure 2:
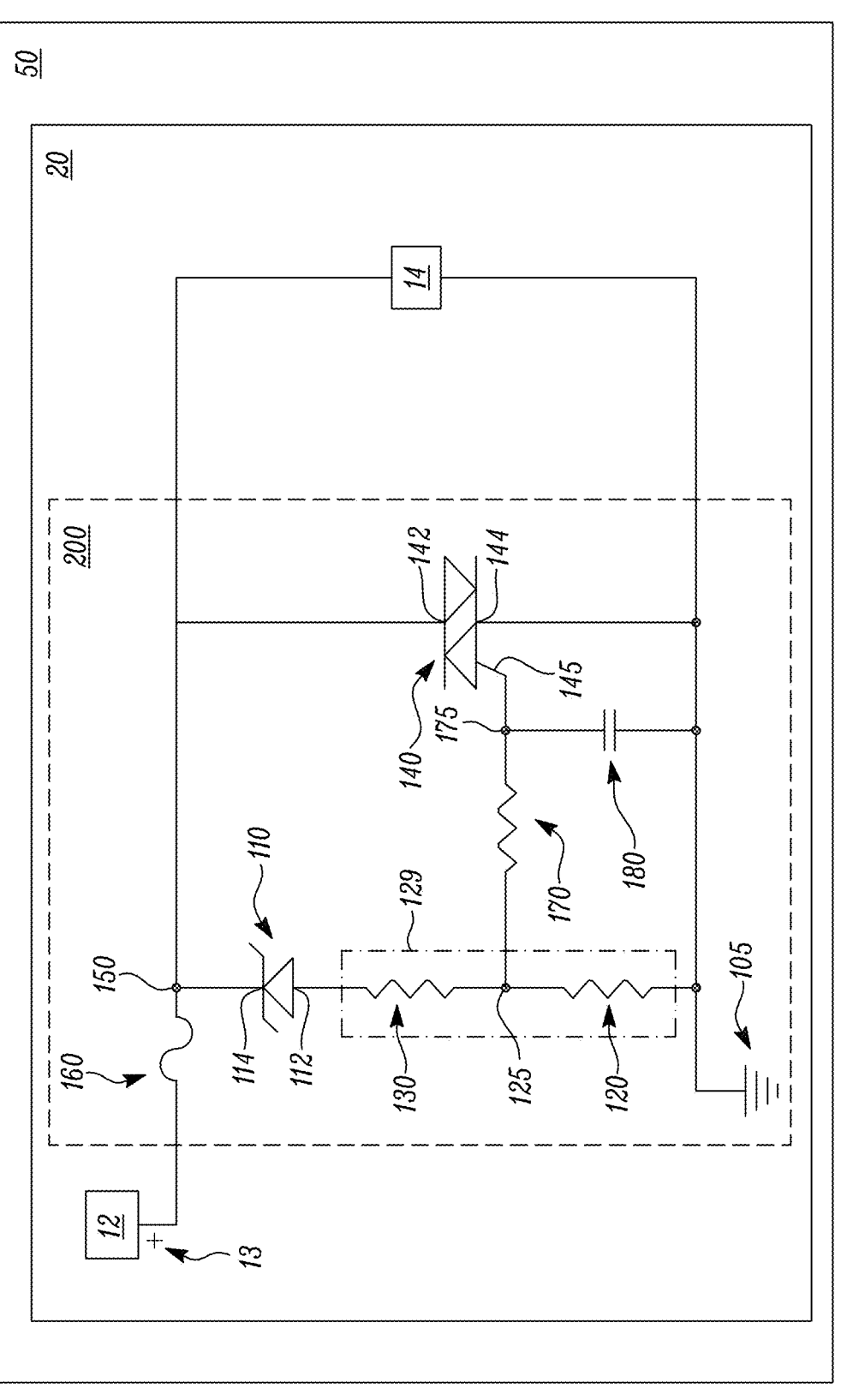
FIG. 2 is a schematic diagram of a system according to another embodiment of the present disclosure.

FIG. 2 illustrates a schematic circuit diagram of a system 20 according to another embodiment of the present disclosure. The system 20 is substantially similar to the system 10 of FIG. 1, with like elements designated by like reference characters.

The system 20 includes a protection circuit 200. The protection circuit 200 is substantially similar to the protection circuit 100 of FIG. 1, with like elements designated by like reference characters. However, the shorting device 140 of the protection circuit 200 is different from that of the protection circuit 100. Specifically, in the illustrated embodiment of FIG. 2, the shorting device 140 is a TRIAC.

In some embodiments, the article of PPE 50 may include the system 20. Specifically, in some embodiments, the article of PPE 50 includes the protection circuit 200. The article of PPE 50 including the protection circuit 200 may be intrinsically safe according to the standards defined in IEC60079.

FIG. 3 illustrates a flowchart depicting a method 300 for protecting an electrical load (e.g., the electrical load 14 of FIG. 1) according to an embodiment of the present disclosure. The method 300 will be described with additional reference to the system 10 of FIG. 1.

At step 302, the method 300 includes providing a power source configured to provide an input voltage. For example, the method 300 may include providing the power source 12 configured to provide the input voltage 13.

At step 304, the method 300 further includes electrically connecting the electrical load to the power source. For example, the method 300 may include electrically connecting the electrical load 14 to the power source 12.

At step 306, the method 300 further includes electrically connecting a cathode of a Zener diode to the power source. For example, the method 300 may include electrically connecting the cathode 114 of the Zener diode 110 to the power source 12.

At step 308, the method 300 further includes electrically connecting a first resistor in series with an anode of the Zener diode and to a ground. For example, the method 300 may include electrically connecting the first resistor 120 in series with the anode 112 of the Zener diode 110 and to the ground 105.

At step 310, the method 300 further includes electrically connecting a second resistor between the anode of the Zener diode and the first resistor. For example, the method 300 may further include electrically connecting the second resistor 130 between the anode 112 of the Zener diode 110 and the first resistor 120.

At step 312, the method 300 further includes electrically connecting a shorting device switchable between an on-state and an off-state between the power source and the ground. The shorting device includes a control terminal electrically connected to an intermediate point electrically disposed between the first resistor and the second resistor. For example, the method 300 may include electrically connecting the shorting device 140 switchable between the on-state and the off-state between the power source 12 and the ground 105.

At step 314, the method 300 further includes electrically connecting a current-limiting safety device between the power source and an input point electrically connected to each of the cathode of the Zener diode, the shorting device, and the electrical load. For example, the method 300 may include electrically connecting the current-limiting safety device 160 between the power source 12 and the input point 150 electrically connected to each of the cathode 114 of the Zener diode 110, the shorting device 140, and the electrical load 14.

At step 316, the method 300 further includes maintaining the shorting device in the off-state when the input voltage is less than a maximum voltage threshold, causing the power source to be electrically disconnected from the ground and the input voltage to be provided to the electrical load. For example, the method 300 may include maintaining the shorting device 140 in the off-state when the input voltage 13 is less than the maximum voltage threshold, causing the power source 12 to be electrically disconnected from the ground 105 and the input voltage 13 to be provided to the electrical load 14.

At step 318, the method 300 further includes applying a control voltage to the control terminal of the shorting device to switch the shorting device from the off-state to the on-state when the input voltage is greater than or equal to the maximum voltage threshold. In the on-state, the shorting device shorts the power source to the ground, causing the current-limiting safety device to break an electrical connection between the power source and the input point and the electrical load to be electrically disconnected from the power source. For example, the method 300 may include applying the control voltage to the control terminal 145 of the shorting device 140 to switch the shorting device 140 from the off-state to the on-state when the input voltage 13 is greater than or equal to the maximum voltage threshold.

In some embodiments, the method 300 further includes electrically connecting a third resistor between the control terminal of the shorting device and the intermediate point. For example, the method 300 may include connecting the third resistor 170 between the control terminal 145 of the shorting device 140 and the intermediate point 125.

In some embodiments, the method 300 further includes electrically connecting a capacitor between the ground and a connection point electrically disposed between the intermediate point and the control terminal. For example, the method 300 may further include electrically connecting the capacitor 180 between the ground 105 and the connection point 175 electrically disposed between the intermediate point 125 and the control terminal 145.

The method 300 may ensure that the electrical load does not receive the input voltage having a magnitude greater than a maximum safe operating voltage of the electrical load, thereby protecting the electrical load from an overvoltage condition.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A protection circuit for use with a power source configured to provide an input voltage to an electrical load, the protection circuit comprising:
   a Zener diode comprising an anode and a cathode, wherein the cathode is electrically connected to the power source;
   a first resistor electrically connected in series with the anode of the Zener diode, wherein the first resistor is further electrically connected to a ground;
   a second resistor electrically connected between the anode of the Zener diode and the first resistor;

an intermediate point electrically disposed between the first resistor and the second resistor;

a shorting device switchable between an on-state and an off-state, wherein the shorting device is electrically connected between the power source and the ground, the shorting device comprising a control terminal electrically connected to the intermediate point, wherein the shorting device switches from the off-state to the on-state when a control voltage is applied at the control terminal via the intermediate point, wherein, in the off-state, the shorting device electrically disconnects the power source from the ground, and wherein, in the on-state, the shorting device electrically shorts the power source to the ground;

an input point electrically connected to each of the cathode of the Zener diode, the shorting device, and the electrical load, wherein the first resistor and the second resistor together form a voltage divider at the intermediate point for the input voltage applied at the input point; and a current-limiting safety device electrically connected between the power source and the input point, wherein the input voltage from the power source is normally applied at the input point via the current-limiting safety device, such that the electrical load is provided with the input voltage, and wherein the current-limiting safety device breaks an electric connection between the power source and the input point when an electric current flowing through the current-limiting safety device exceeds a maximum current threshold;

wherein:

the Zener diode, the first resistor, and the second resistor together define a maximum voltage threshold of the protection circuit; and when the input voltage is less than the maximum voltage threshold, the shorting device is maintained in the off-state, causing the power source to be electrically disconnected from the ground and the input voltage to be provided to the electrical load;

when the input voltage is greater than or equal to the maximum voltage threshold, the control voltage is applied at the control terminal, causing the shorting device to switch from the off-state to the on-state;

in the on-state, the shorting device electrically shorts the power source to the ground, causing the electric current flowing through the current-limiting safety device to exceed the maximum current threshold and the current-limiting safety device to break the electrical connection between the power source and the input point; and the electrical load is electrically disconnected from the power source upon breakage of the electric connection between the power source and the input point.

2. The protection circuit of claim 1, wherein the Zener diode has a Zener voltage, and wherein the maximum voltage threshold is greater than or equal to the Zener voltage.

3. The protection circuit of claim 1, wherein:

when the input voltage is less than the maximum voltage threshold, the control voltage is not applied at the control terminal of the shorting device; and when the input voltage is greater than or equal to the maximum voltage threshold, the control voltage is applied at the control terminal of the shorting device.

4. The protection circuit of claim 1, wherein the shorting device further comprises a first terminal electrically connected to the power source and a second terminal electrically connected to the ground, wherein, in the on-state, the shorting device electrically connects the first terminal with the second terminal, and wherein, in the off-state, the shorting device electrically disconnects the first terminal with the second terminal.

5. The protection circuit of claim 1, wherein the shorting device is a silicon controlled rectifier (SCR) or a triode for alternating current (TRIAC).

6. The protection circuit of claim 1, wherein the control terminal of the shorting device is a gate terminal.

7. The protection circuit of claim 1, wherein the current-limiting safety device is a fuse.

8. The protection circuit of claim 1, further comprising a third resistor electrically connected between the control terminal of the shorting device and the intermediate point.

9. The protection circuit of claim 1, further comprising a capacitor electrically connected between the ground and a connection point electrically disposed between the intermediate point and the control terminal.

10. An article of personal protective equipment (PPE) comprising the protection circuit of claim 1, wherein the article of PPE is intrinsically safe according to the standards defined in IEC60079.

11. A method for protecting an electrical load, the method comprising:

providing a power source configured to provide an input voltage;

electrically connecting the electrical load to the power source;

electrically connecting a cathode of a Zener diode to the power source;

electrically connecting a first resistor in series with an anode of the Zener diode and to a ground;

electrically connecting a second resistor between the anode of the Zener diode and the first resistor;

electrically connecting a shorting device switchable between an on-state and an off-state between the power source and the ground, wherein the shorting device comprises a control terminal electrically connected to an intermediate point electrically disposed between the first resistor and the second resistor;

electrically connecting a current-limiting safety device between the power source and an input point electrically connected to each of the cathode of the Zener diode, the shorting device, and the electrical load;

maintaining the shorting device in the off-state when the input voltage is less than a maximum voltage threshold, causing the power source to be electrically disconnected from the ground and the input voltage to be provided to the electrical load; and applying a control voltage to the control terminal of the shorting device to switch the shorting device from the off-state to the on-state when the input voltage is greater than or equal to the maximum voltage threshold;

wherein in the on-state, the shorting device shorts the power source to the ground, causing the current-limiting safety device to break an electrical connection between the power source and the input point and the electrical load to be electrically disconnected from the power source.

12. The method of claim 11, further comprising electrically connecting a third resistor between the control terminal of the shorting device and the intermediate point.

13. The method of claim 11, further comprising electrically connecting a capacitor between the ground and a connection point electrically disposed between the intermediate point and the control terminal.

14. A system comprising:

a power source configured to provide an input voltage;

an electrical load connected to the power source, wherein the electrical load is configured to receive the input voltage; and a protection circuit electrically connected between the power source and the electrical load, the protection circuit comprising:

a Zener diode comprising an anode and a cathode, wherein the cathode is electrically connected to the power source;

a first resistor electrically connected in series with the anode of the Zener diode, wherein the first resistor is further electrically connected to a ground;

a second resistor electrically connected between the anode of the Zener diode and the first resistor;

an intermediate point electrically disposed between the first resistor and the second resistor;

a shorting device switchable between an on-state and an off-state, wherein the shorting device is electrically connected between the power source and the ground, the shorting device comprising a control terminal electrically connected to the intermediate point, wherein the shorting device switches from the off-state to the on-state when a control voltage is applied at the control terminal via the intermediate point, wherein, in the off-state, the shorting device electrically disconnects the power source from the ground, and wherein, in the on-state, the shorting device electrically shorts the power source to the ground;

an input point electrically connected to each of the cathode of the Zener diode, the shorting device, and the electrical load, wherein the first resistor and the second resistor together form a voltage divider at the intermediate point for the input voltage applied at the input point; and

a current-limiting safety device electrically connected between the power source and the input point, wherein the input voltage from the power source is normally applied at the input point via the current-limiting safety device, such that the electrical load is provided with the input voltage, and wherein the current-limiting safety device breaks an electric connection between the power source and the input point when an electric current flowing through the current-limiting safety device exceeds a maximum current threshold;

wherein:

the Zener diode, the first resistor, and the second resistor together define a maximum voltage threshold of the protection circuit;

when the input voltage is less than the maximum voltage threshold, the shorting device is maintained in the off-state, causing the power source to be electrically disconnected from the ground and the input voltage to be provided to the electrical load;

when the input voltage is greater than or equal to the maximum voltage threshold, the control voltage is applied at the control terminal, causing the shorting device to switch from the off-state to the on-state;

in the on-state, the shorting device electrically shorts the power source to the ground, causing the electric current flowing through the current-limiting safety device to exceed the maximum current threshold and the current-limiting safety device to break the electrical connection between the power source and the input point; and the electrical load is electrically disconnected from the power source upon breakage of the electric connection between the power source and the input point.

* * * * *